(12) United States Patent
Wei et al.

(10) Patent No.: US 7,085,792 B2
(45) Date of Patent: Aug. 1, 2006

(54) LOOK-UP TABLE METHODS FOR REDUCING THE USE OF MEMORY VOLUME AND SYSTEM THEREOF

(75) Inventors: Jian-Fan Wei, YiLan (TW); Cheng-Hsin Chang, TaiNan (TW)

(73) Assignee: Realtek Semiconductor Corp. (TW)

( * ) Notice: Subject to any disclaimer, the term of this patent is extended or adjusted under 35 U.S.C. 154(b) by 631 days.

(21) Appl. No.: 10/310,319

(22) Filed: Dec. 5, 2002

(65) Prior Publication Data
US 2003/0123304 A1 Jul. 3, 2003

(30) Foreign Application Priority Data
Dec. 28, 2001 (TW) .............................. 90133481 A

(51) Int. Cl.
*G06F 1/02* (2006.01)
(52) U.S. Cl. .................................... 708/272
(58) Field of Classification Search .............. 708/272, 708/724, 727, 274, 277
See application file for complete search history.

(56) References Cited

U.S. PATENT DOCUMENTS

| | | | |
|---|---|---|---|
| 5,289,406 A * | 2/1994 | Uramoto et al. ............ 365/104 |
| 5,937,088 A | 8/1999 | Hsu |
| 6,919,975 B1 * | 7/2005 | Haikin et al. ............... 358/518 |
| 6,931,426 B1 * | 8/2005 | Cho .......................... 708/272 |

* cited by examiner

Primary Examiner—Chuong D. Ngo

(57) ABSTRACT

The present invention relates to a look up table method for reducing the use of memory and more particularly to a condition while the input value has higher bits than the output value. This look up table method comprises: data storing that storing the input data into memory corresponding with output data with reference to the address of output data; and data searching including reading an input data, finding a closest address to the input data, and outputting the closest address. In this present invented look-up table method, the relation curve between the output value and corresponded input value is a monotonic curve, such as a γ curve.

9 Claims, 5 Drawing Sheets

LOOK-UP TABLE METHODS FOR REDUCING THE USE OF MEMORY VOLUME AND SYSTEM THEREOF

FIELD OF THE INVENTION

The present invention relates to a look up table and more particularly to a look up table for reducing memory usage.

DESCRIPTION OF THE PRIOR ART

Conventionally, most image capture system, such as image scanners, multi-function peripherals (MFP), and digital cameras utilize charge couple device (CCD), or contact image sensor (CIS), to convert opto signals to electrical signals. In addition, the converted electrical signals have to be calibrated by a γ curve to adjust the image's color, brightness and sharpness. In order to simplify the calculation of γ curve, conventional methods are to pre-calculate the output of γ curve corresponding with each input, use the input value as the storage address and store the corresponded output into memory. After that, a look-up table is used to search the data stored in the input address and find the calibrated output value. FIG. 1 demonstrates the storage of input-output coupling in a conventional look up table method. For example, If the input value is 16 bits and the output value is 8 bits, 65536 bytes, 64 KB, are required to fully store the output of the whole γ curve. This would be a burden for a small system.

In order to reduce the use of memory volume, there is another method which stores only the data corresponding with the higher bits of input and uses a interpolating method to obtain approximate γ curve. For example, while inputting a 16 bits data, only the highest 8 bits of the output data are needed to be stored. In this condition, only 256 bytes of memory are utilized to store the total output. However, because the interpolating method is utilized to calculate the approximate γ curve, subsequent calculations based on this approximate γ curve would generate rounding errors and detriment the quality of images.

SUMMARY OF THE INVENTION

Accordingly, it is the object of the present invention to provide a look-up table method which uses the output value as the storage address to store the corresponded input value, and uses a simplified searching method to obtain the output value.

It is another object of the present invention to provide a look-up table method that can reduce the use of memory volume and can store the completed curve of output value.

In order to achieve the foregoing object, the present invention provides a look-up table method, comprising the following steps: A data storing step stores each of the input values corresponding with each of the output values to memory with reference to the address of the output values; a data searching step includes reading an input value, finding a closest address to the input value, and producing the closest address.

More particularly, within the range of output value, the input-output relation curve is a monotonic curve, such as a γ curve.

BRIEF DESCRIPTION OF THE DRAWINGS

The present invention will be described by way of exemplary embodiments, but not limitations, illustrated in the accompanying drawings in which like references denote similar elements, and in which.

DESCRIPTION OF THE PREFERRED EMBODIMENT

A preferred embodiment of the present invention will be described hereinafter.

Figure 1:
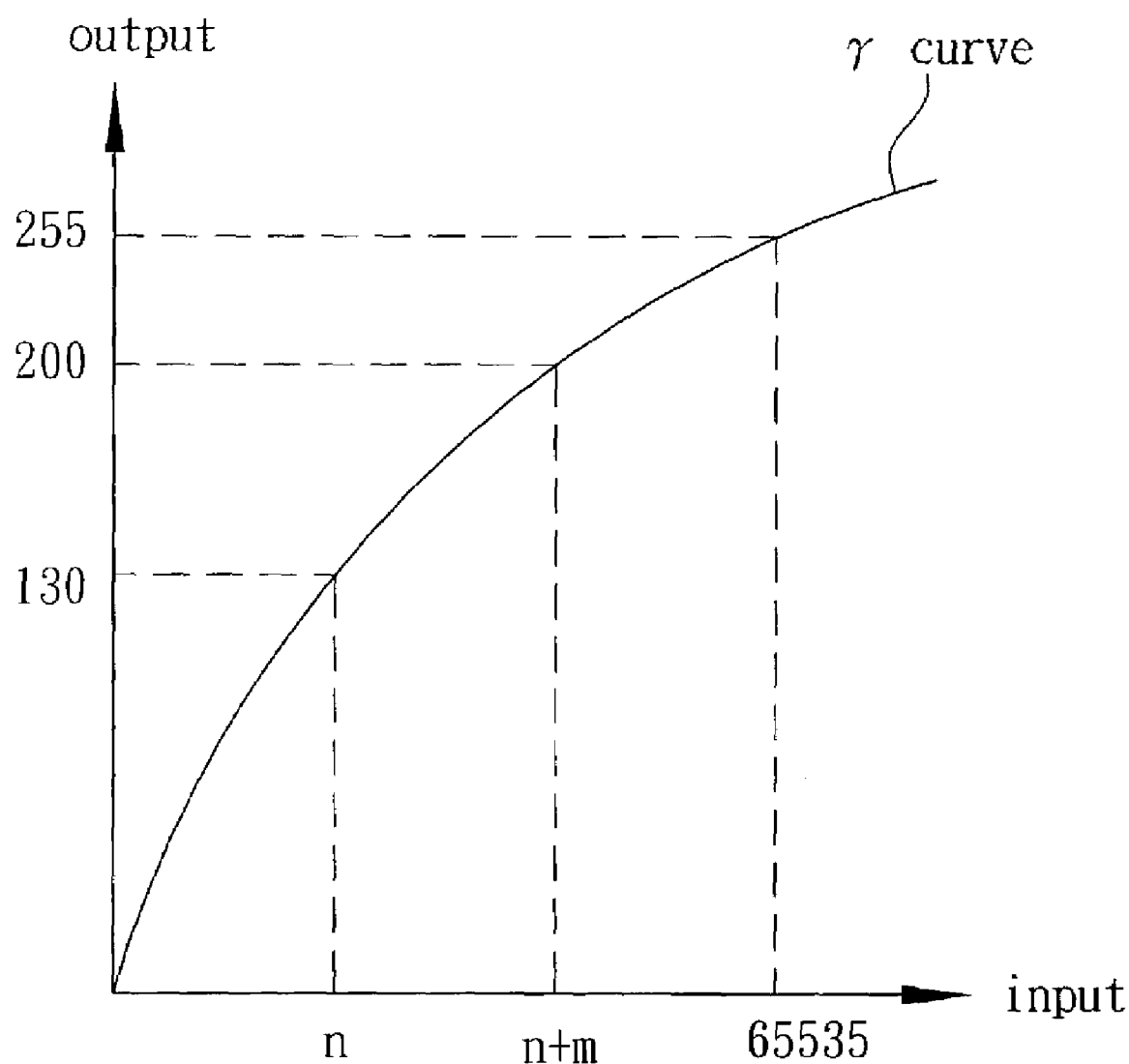
FIG. 1 schematically illustrates the storage of input-output coupling in the conventional data searching method.
Figure 2:
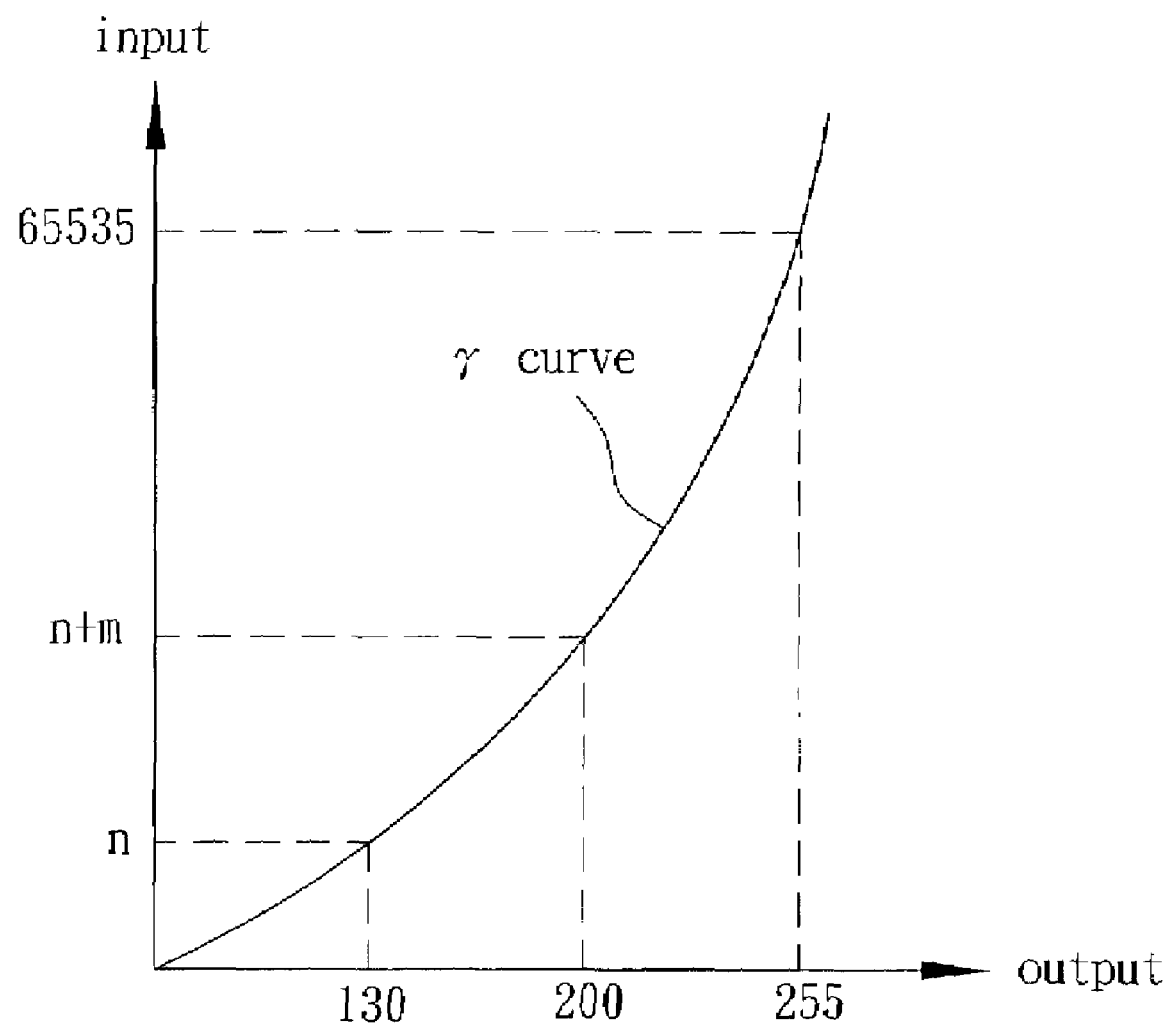
FIG. 2 schematically illustrates the input-output relation in the present invention.

FIG. 2 demonstrates the relation of input-output value of the present invented look-up table method. As demonstrated in this figure, the X axis represents the output value whereas the Y axis represents the input value. The present invention use a different storage method in compared to the conventional look-up table. The conventional look-up table method uses the input value as the index of storage address whereas the present invention uses the output value as the index of the storage address. Therefore, for conditions that the input value is 16 bits and the output value is 8 bits, the conventional look-up table method needs a storage space of 65536 bytes whereas the present invention needs only 512 bytes. The present invention can reduce the requirement of storage space.

The following statements illustrate how the data is stored into memory in the present invention. Because the present invention utilizes the output value as the address of memory, it is the input value that is calculated corresponding with each of the output values. This is different from the conventional look up table method which retrieves the output value corresponding with each input value. It should be noticed that since the present invention uses the output value as the address of memory, the input-output relation curve has to be a Monotonic curve. For those non-Monotonic curves, the present invention is still functional. If the input-output relation curve is a Parabolic curve, the parabolic curve is separated from the maximum or minimum peak so as to create two monotonic curves in attempt to meet the prerequisite of monotonic curves. Such as in a γ curve, there are only one absolute maximum and one absolute minimum. After calculating the input values corresponding with the output values, the input values are sequentially stored into memory. Because the input value is 16 bits, the data corresponding with each output value is 2 bytes. Thus, 512 Bytes are needed to store 256 sets of output. In conditions of Parabolic curve which will be separated into two Monotonic curves, two sets of 512 Bytes are needed to store the total output. Therefore, 1024 Bytes are stored in total.

Figure 3:
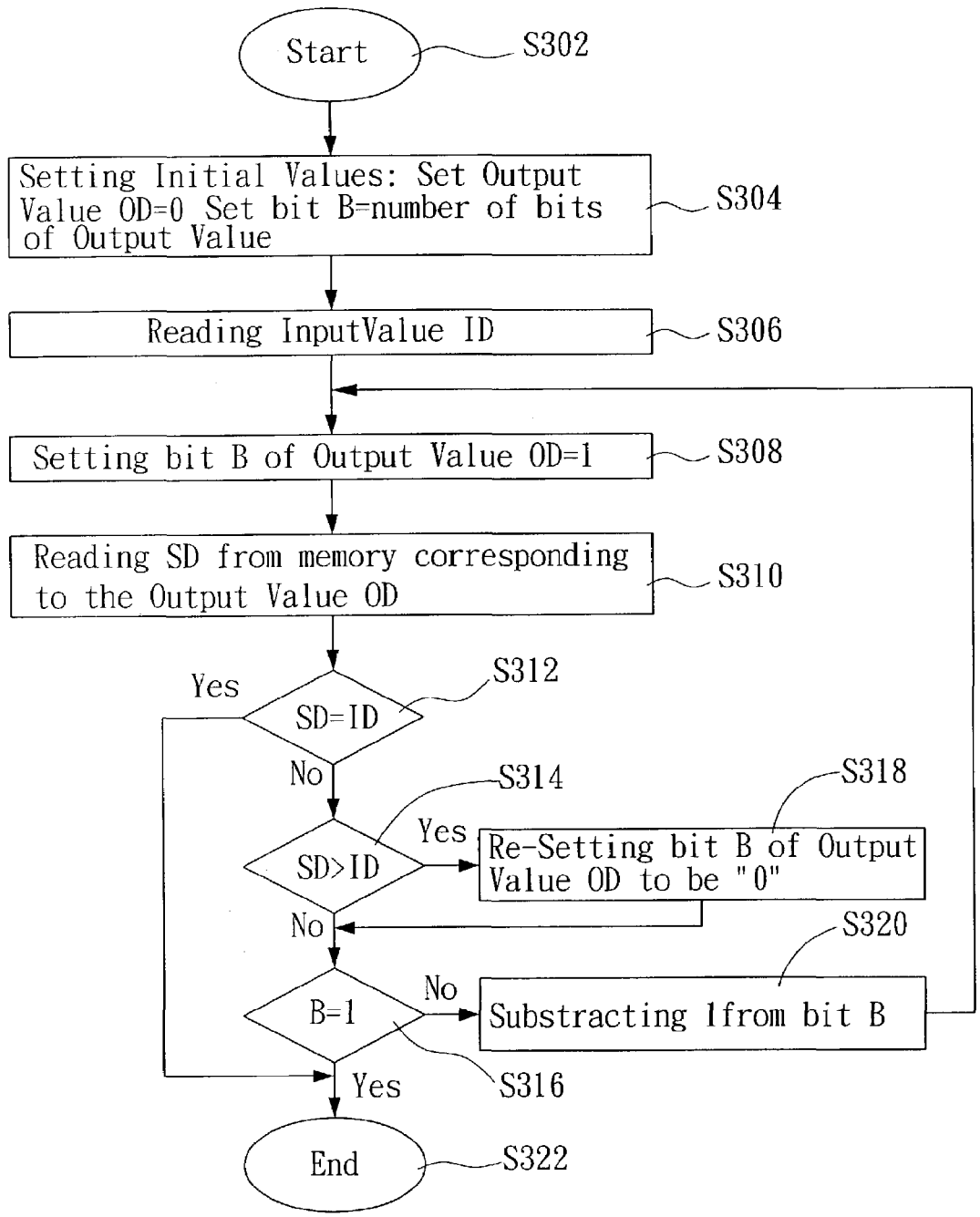
FIG. 3 schematically illustrates the procedures to find the output value based on an input value.

The following statements illustrate the method to find the output value based on the input value in the present invented look-up table method. After reading an input value, the closest address to this input value will be searched from the memory. In that case, the output value is calculated from this closest address. There are many search methods that can be used. One embodiment is a binary search method. Please refer to FIG. 3. The present invention uses the binary search method, comprising the steps of:

Step S302: Start.

Step S304: Setting initial value. Assigning '0' to the hypothesized output value and assigning the number of bits of output value to the search bit B.

Step S306: Reading the input value ID. In other words, reading the input value ID that needed to be inquired.

Step S308: Setting the hypothesized output value OD. Assigning 1 to the Bth bit of the hypothesized output value OD.

Step S310: Reading stored data. Using the hypothesized output value OD as an address index, reading the corresponding stored input value SD form memory.

Step S312: Comparing the input value ID to the stored input value SD. If SD is equal to ID, it indicates that the output value corresponding to ID is the hypothesized OD. Then, jumping to step S322.

Step S314: Comparing the input value ID to the stored input value SD. If SD is greater than ID, it indicates that the output value corresponding to ID is less than the hypothesized output value OD, and jumping to step S318; otherwise jumping to S316.

Step S316: Accessing if the searching has been processed to the least significant bit LSB. If B is equal to 1, it indicates that the searching has been processed to the least significant bit LSB, and jumping to step S322; otherwise jumping to S320.

Step S318: Re-setting the hypothesized output value OD. Assigning '0' to the Bth bit of the hypothesized output value OD and keeping other bits unchanged. Jump to step S316.

Step S320: Modifying the value of the searching bit B. Subtracting 1 from the searching bit B that represents searching the next bit. Then, return to step S308.

Step S322: Generating an output value and terminating. Let the hypothesized output value OD to be the actual output value.

Figure 4:
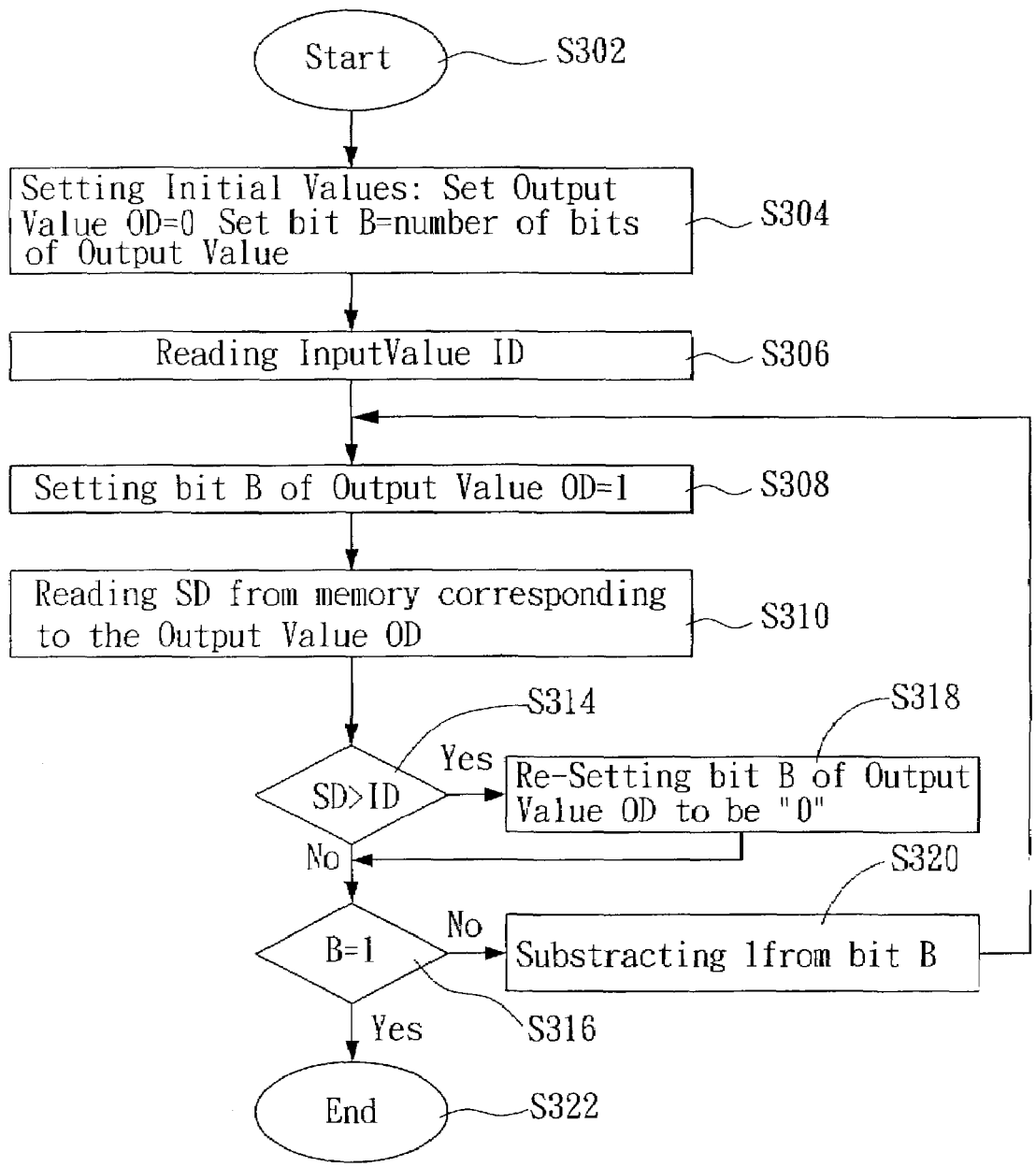
FIG. 4 demonstrates another example of finding the output value based on an input value.

There is another embodiment which skips the step S312. FIG. 4 gives a flow chart to illustrate this embodiment.

Figure 5:
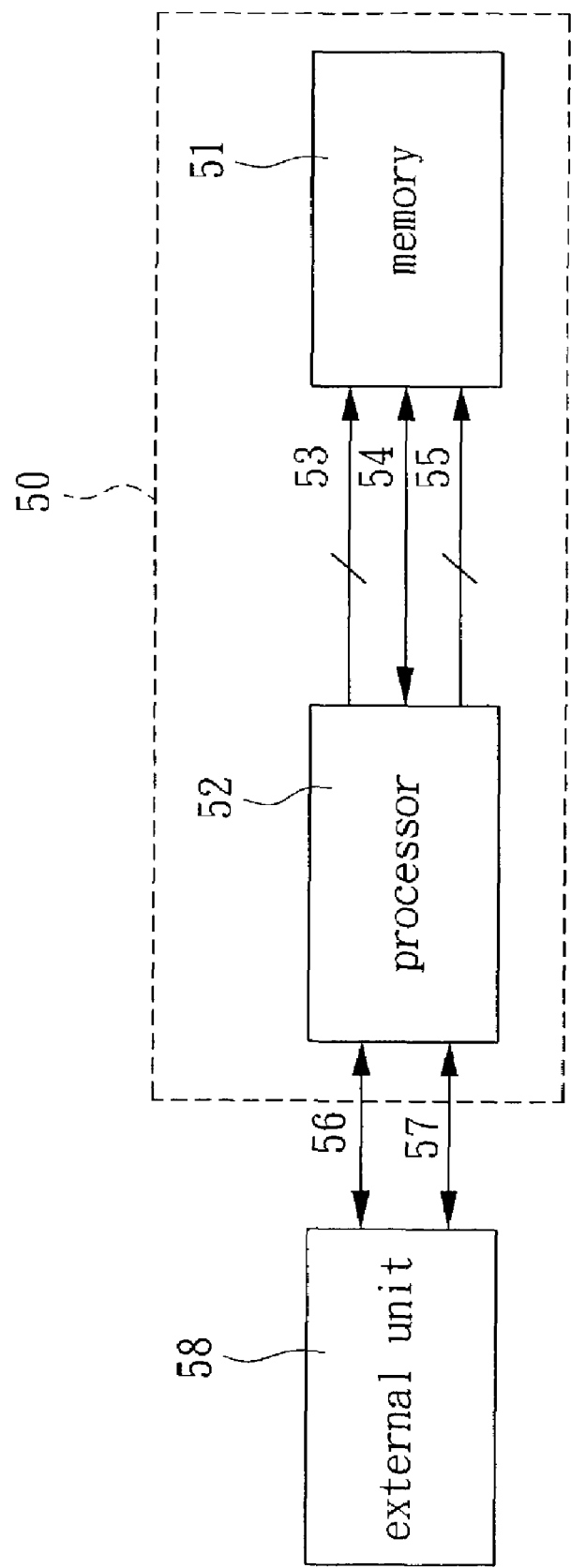
FIG. 5 schematically illustrates the structure of how the present invention reduces the use of memory.

FIG. 5 schematically illustrates the structure for reducing the use of memory in the present invention. This structure uses the address of output to store the input value of a monotonic curve. As shown in this figure, this structure 50 comprises a memory 51 and a processor 52. The processor 52 and the memory 51 are connected by the address bus 53, data bus 54, and reading/writing control signal 55. The processor 51 receives the signal 56 generated from the external unit 58, reads an input value from the external unit 58 through bus 57, and outputs the found data to the external unit 58 through bus 57.

The structure 50 uses the processor 52 to store the input of a monotonic curve into the memory 51. The processor 52 sets the reading/writing control signal 55 as the writing mode, treats the output of the monotonic curve as the address of the address bus 53, treats the input of the Monotonic curve as the data of the data bus 54 corresponding to each of the output value, and stores the data into bus 51. When the structure 50 reads in the output of the monotonic curve through the processor 52, the processor 52 sets the reading/writing control signal 55 as the reading mode. At the same time, the processor 52 searches the memory 51 according to an input, finds a closest address to this input, and outputs this closest address corresponding with the input. The searching method utilized by the processor 52 can be a binary searching method.

While the present invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. A look-up table method for reducing the use of memory volume, wherein an input value has higher bits than an output value, and a relation curve between said input data and said output data is a Monotonic curve, said method comprising:

storing data, taking the output value as a reference of a memory address and storing each of the input value to said memory address corresponding with the output value; and searching data, including reading an input value to be searched, searching an closest address to said input value in said memory and obtaining said output value from said closest address;

wherein said searching comprises a binary search procedure.

2. The method of claim 1, wherein said relation curve is a γ curve.

3. The method of claim 1, wherein said binary search procedure comprises:

setting an initial value, wherein a hypothesized output OD is set as 0 and a searching bit B is set as the number of bits of said output value;

reading an input value ID to be searched;

setting said hypothesized output value OD, wherein assigning one to a $B^{th}$ bit of said output value OD;

reading a stored input value SD corresponding with said hypothesized output value OD from said memory;

comparing said stored input value SD with said input value ID, while said SD is equal to said ID, outputting said hypothesized output value OD and terminating said binary searching procedure, while said SD is greater than said ID, assigning zero to said $B^{th}$ bit of said hypothesized output value OD;

checking the value of said searching bit B, while said searching bit B is equal to 1, outputting said hypothesized output value OD and terminating said binary searching procedure, while said searching bit B is not equal to 1, subtracting 1 from said searching bit B and returning to said setting said hypothesized output value OD step.

4. The method of claim 1, wherein said binary search procedure comprises:

setting an initial value, wherein a hypothesized output value OD is set as 0 and a searching bit B is set as the number of bits of said output value;

reading an input value ID to be searched;

setting said hypothesized output value OD, wherein assigning one to said $B^{th}$ bit of said output value OD;

reading a stored input value SD corresponding with said hypothesized output value OD from said memory;

comparing said stored input value SD with said input value ID, while said SD is greater than said ID, assigning zero to said $B^{th}$ bit of said hypothesized output value OD;

checking the value of said searching bit B, while said searching bit B is equal to 1, outputting said hypothesized output value OD and terminating said binary searching procedure, while said searching bit B is not equal to 1, subtracting 1 from said searching bit B and returning to said setting said hypothesized output value OD step.

5. A method for reducing the use of memory volume, wherein an input value has higher bits than an output value, the method comprising:
   a data storing step for storing each of an input value into a memory corresponding with each of an output value with references to an address of said output value, wherein a relation curve between said input data and said output data is a Monotonic curve; and
   a data searching step for finding a closest address to an input value needed to be read and calculating an output value from said closest address, wherein said data searching step for comprises a binary search method.

6. The method of claim 5, wherein said Monotonic curve is a γ curve.

7. A method for reducing the use of a memory volume, wherein an input value has higher bits than an output value, said method comprising:
   creating Monotonic curves, wherein a non-Monotonic curve of said output value is separated from the relative peaks to produce a plurality of monotonic curves;
   taking the output value as a reference of a memory address and storing each of the input value to said memory address corresponding with the output value; and
   reading an input value to be searched, searching an closest address to said input value in said memory and obtaining said output value from said closest address;
   wherein said searching comprises a binary search method.

8. A device for reducing the use of memory volume and storing a plurality of values of at least one monotonic functions, said device comprising:
   a memory; and
   a processor coupled to said memory with a data transmitting line, an address line and a reading/writing controlling signal;
   while said reading/writing controlling signal is at a writing mode, an address of said address line is set as an output value, and a data in said data transmitting line is set as each of an input value corresponding with each of said output value, and said input value is stored in said memory; and
   while said reading/writing controlling signal is at reading mode, said processor reading an input value, searching a closest address to said input value from said memory, and retrieving said closest address, wherein said searching comprises a binary searching method.

9. The device of claim 8, wherein said device stores a plurality of values of two monotonic functions.

* * * * *